US007697700B2

(12) United States Patent
Mao

(10) Patent No.: US 7,697,700 B2
(45) Date of Patent: Apr. 13, 2010

(54) NOISE REMOVAL FOR ELECTRONIC DEVICE WITH FAR FIELD MICROPHONE ON CONSOLE

(75) Inventor: Xiadong Mao, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 344 days.

(21) Appl. No.: 11/381,727

(22) Filed: May 4, 2006

(65) Prior Publication Data

US 2007/0258599 A1 Nov. 8, 2007

(51) Int. Cl.
*H04B 15/00* (2006.01)

(52) U.S. Cl. .................. 381/94.3; 381/71.3; 381/71.14

(58) Field of Classification Search ................ 381/94.3, 381/71.3, 94.1, 94.2, 71.14, 71.5, 98; 704/233
See application file for complete search history.

(56) References Cited

U.S. PATENT DOCUMENTS

| | | | | |
|---|---|---|---|---|
| 4,802,227 | A * | 1/1989 | Elko et al. | 381/92 |
| 4,852,180 | A * | 7/1989 | Levinson | 704/256.4 |
| 5,321,636 | A * | 6/1994 | Beerends | 702/76 |
| 5,335,011 | A | 8/1994 | Addeo et al. | 348/15 |
| 5,511,128 | A * | 4/1996 | Lindemann | 381/92 |
| 5,550,924 | A * | 8/1996 | Helf et al. | 381/94.3 |
| 5,791,869 | A * | 8/1998 | Lee | 415/119 |
| 5,806,025 | A * | 9/1998 | Vis et al. | 704/226 |
| 6,009,396 | A | 12/1999 | Nagata | 704/270 |
| 6,044,340 | A * | 3/2000 | Van Hamme | 704/226 |
| 6,173,059 | B1 | 1/2001 | Huang et al. | 381/92 |
| 6,618,073 | B1 | 9/2003 | Lambert et al. | 348/14.08 |
| 7,139,401 | B2 * | 11/2006 | Culman et al. | 381/71.7 |
| 7,386,135 | B2 | 6/2008 | Fan | 381/92 |
| 2003/0160862 | A1 | 8/2003 | Charlier et al. | 348/14.08 |
| 2004/0047464 | A1 | 3/2004 | Yu et al. | 379/392.01 |
| 2004/0148166 | A1 * | 7/2004 | Zheng | 704/233 |
| 2004/0213419 | A1 | 10/2004 | Varma et al. | 381/92 |

(Continued)

FOREIGN PATENT DOCUMENTS

| | | |
|---|---|---|
| EP | 0 652 686 | 5/1995 |

(Continued)

OTHER PUBLICATIONS

U.S. Appl. No. 10/759,782, entitled "Method and Apparatus for Light Input Device", to Richard L. Marks, filed Jan. 16, 2004.

(Continued)

*Primary Examiner*—Xu Mei
*Assistant Examiner*—Jason R Kurr
(74) *Attorney, Agent, or Firm*—Joshua D. Isenberg; JDI Patent

(57) ABSTRACT

Reduction of noise in a device having a console with one or more microphones and a source of narrow band distributed noise located on the console is disclosed. A microphone signal containing a broad band distributed desired sound and narrow band distributed noise is divided amongst a plurality of frequency bins. For each frequency bin, it is determined whether a portion of the signal within the frequency bin belongs to a narrow band distribution characteristic of the source of narrow band noise located on the console. Any frequency bins containing portions of the signal belonging to the narrow band distribution are filtered to reduce the narrow band noise.

21 Claims, 3 Drawing Sheets

U.S. PATENT DOCUMENTS

| | | | | |
|---|---|---|---|---|
| 2005/0047611 | A1 | 3/2005 | Mao | 381/94.7 |
| 2005/0226431 | A1 | 10/2005 | Mao | 381/61 |

FOREIGN PATENT DOCUMENTS

| | | |
|---|---|---|
| EP | 1 489 596 | 12/2004 |
| WO | WO 2004/073814 | 9/2004 |
| WO | WO 2004/073815 | 9/2004 |

OTHER PUBLICATIONS

U.S. Appl. No. 11/429,414, entitled "Computer Image and Audio Processing of Intensity and Input Device When Interfacing With a Computer Program", to Richard L. Marks et al, filed May 4, 2006.

U.S. Appl. No. 11/381,729, entitled "Ultra Small Microphone Array", to Xiadong Mao, filed May 4, 2006.

U.S. Appl. No. 11/381,728, entitled "Echo and Noise Cancellation", to Xiadong Mao, filed May 4, 2006.

U.S. Appl. No. 11/381,725, entitled "Methods and Apparatus for Targeted Sound Detection", to Xiadong Mao, filed May 4, 2006.

U.S. Appl. No. 11/381,721, entitled "Selective Sound Source Listening in Conjunction With Computer Interactive Processing", to Xiadong Mao, filed May 4, 2006.

U.S. Appl. No. 11/381,724, entitled "Methods and Apparatus for Targeted Sound Detection and Characterization", to Xiadong Mao, filed May 4, 2006.

U.S. Appl. No. 11/418,988, entitled "Methods and Apparatuses for Adjusting a Listening Area for Capturing Sounds", to Xiadong Mao, filed May 4, 2006.

U.S. Appl. No. 11/418,989, entitled "Methods and Apparatuses for Capturing an Audio Signal Based on Visual Image", to Xiadong Mao, filed May 4, 2006.

U.S. Appl. No. 11/429,047, entitled "Methods and Apparatuses for Capturing an Audio Signal Based on a Location of the Signal", to Xiadong Mao, filed May 4, 2006.

U.S. Appl. No. 11/418,993, entitled "System and Method for Control by Audible Device", to Steven Osman, filed May 4, 2006.

Mark Fiala et al., "A Panoramic Video and Acoustic Beamforming Sensor for Videoconferencing", IEEE, Oct. 2-3, 2004, pp. 47-52.

Kevin W. Wilson et al., "Audio-Video Array Source Localization for Intelligent Environments", IEEE 2002, vol. 2, pp. 2109-2112.

Y. Ephraim and D. Malah, "Speech enhancement using a minimum mean-square error short-time spectral amplitude estimator," *IEEE Trans. Acoust., Speech, Signal Processing*, vol. ASSP-32, pp. 1109-1121, Dec. 1984.

Y. Ephraim and D. Malah, "Speech enhancement using a minimum mean-square error log-spectral amplitude estimator," *IEEE Trans. Acoust., Speech, Signal Processing*, vol. ASSP-33, pp. 443-445, Apr. 1985.

International Search Report and Written Opinion of the International Searching Authority dated Jul. 1, 2008—International Patent Application No. PCT/US07/65701.

Non Final Office Action Dated Aug. 19, 2008—U.S. Appl. No. 11/381,725.

Non Final Office Action Dated Aug. 20, 2008—U.S. Appl. No. 11/381,724.

* cited by examiner

NOISE REMOVAL FOR ELECTRONIC DEVICE WITH FAR FIELD MICROPHONE ON CONSOLE

CROSS-REFERENCE TO RELATED APPLICATIONS

This application is related to commonly-assigned, co-pending application Ser. No. 11/381,729, to Xiao Dong Mao, entitled ULTRA SMALL MICROPHONE ARRAY, filed the same day as the present application, the entire disclosures of which are incorporated herein by reference. This application is also related to commonly-assigned, co-pending application Ser. No. 11/381,728, to Xiao Dong Mao, entitled ECHO AND NOISE CANCELLATION, filed the same day as the present application, the entire disclosures of which are incorporated herein by reference. This application is also related to commonly-assigned, co-pending application Ser. No. 11/381,725, to Xiao Dong Mao, entitled "METHODS AND APPARATUS FOR TARGETED SOUND DETECTION", filed the same day as the present application, the entire disclosures of which are incorporated herein by reference. This application is also related to commonly-assigned, co-pending application Ser. No. 11/381,724, to Xiao Dong Mao, entitled "METHODS AND APPARATUS FOR TARGETED SOUND DETECTION AND CHARACTERIZATION", filed the same day as the present application, the entire disclosures of which are incorporated herein by reference. This application is also related to commonly-assigned, co-pending application Ser. No. 11/381,721, to Xiao Dong Mao, entitled "SELECTIVE SOUND SOURCE LISTENING IN CONJUNCTION WITH COMPUTER INTERACTIVE PROCESSING", filed the same day as the present application, the entire disclosures of which are incorporated herein by reference. This application is also related to commonly-assigned, co-pending International Patent Application number PCT/US06/17483, to Xiao Dong Mao, entitled "SELECTIVE SOUND SOURCE LISTENING IN CONJUNCTION WITH COMPUTER INTERACTIVE PROCESSING", filed the same day as the present application, the entire disclosures of which are incorporated herein by reference. This application is also related to commonly-assigned, co-pending application Ser. No. 11/418,988, to Xiao Dong Mao, entitled "METHODS AND APPARATUSES FOR ADJUSTING A LISTENING AREA FOR CAPTURING SOUNDS", filed the same day as the present application, the entire disclosures of which are incorporated herein by reference. This application is also related to commonly-assigned, co-pending application Ser. No. 11/418,989, to Xiao Dong Mao, entitled "METHODS AND APPARATUSES FOR CAPTURING AN AUDIO SIGNAL BASED ON VISUAL IMAGE", filed the same day as the present application, the entire disclosures of which are incorporated herein by reference. This application is also related to commonly-assigned, co-pending application Ser. No. 11/429,047, to Xiao Dong Mao, entitled "METHODS AND APPARATUSES FOR CAPTURING AN AUDIO SIGNAL BASED ON A LOCATION OF THE SIGNAL", filed the same day as the present application, the entire disclosures of which are incorporated herein by reference.

FIELD OF THE INVENTION

Embodiments of the present invention are directed to audio signal processing and more particularly to removal of console noise in a device having a microphone located on a device console.

BACKGROUND OF THE INVENTION

Many consumer electronic devices utilize a console that includes various user controls and inputs. In many applications, such as video game consoles, cable television set top boxes and digital video recorders it is desirable to incorporate a microphone into the console. To reduce cost the microphone is typically a conventional omni-directional microphone having no preferred listening direction. Unfortunately, such electronic device consoles also contain noise sources, such as cooling fans, hard-disk drives, CD-ROM drives and digital video disk (DVD) drives. A microphone located on the console would pick up noise from these sources. Since these noise sources are often located quite close to the microphone (s) they can greatly interfere with desired sound inputs, e.g., user voice commands. To address this problem techniques for filtering out noise from these sources have been implemented in these devices.

Most previous techniques have been effective in filtering out broad band distributed noise. For example, fan noise is Gaussian distributed and therefore distributed over a broad band of frequencies. Such noise can be simulated with a Gaussian and cancelled out from the input signal to the microphone on the console. Noise from a disk drive, e.g., a hard disk or DVD drive is characterized by a narrow-band frequency distribution such as a gamma-distribution or a narrow band Laplacian distribution. Unfortunately, deterministic methods that work with Gaussian noise are not suitable for removal of gamma-distributed noise. Thus, there is a need in the art, for a noise reduction technique that overcomes the above disadvantages.

SUMMARY OF THE INVENTION

Embodiments of the invention are directed to reduction of noise in a device having a console with one or more microphones and a source of narrow band distributed noise located on the console. A microphone signal containing a broad band distributed desired sound and narrow band distributed noise is divided amongst a plurality of frequency bins. For each frequency bin, it is determined whether a portion of the signal within the frequency bin belongs to a narrow band distribution characteristic of the source of narrow band noise located on the console. Any frequency bins containing portions of the signal belonging to the narrow band distribution are filtered to reduce the narrow band noise.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Figure 1:
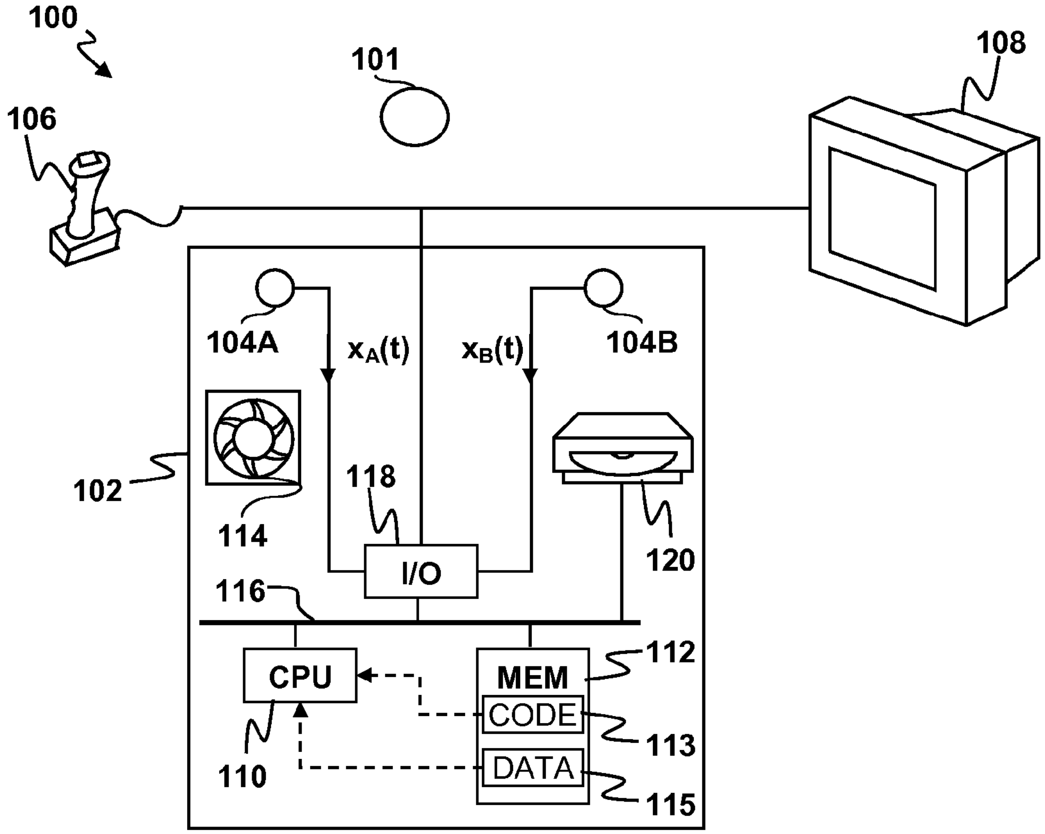
FIG. 1 is a schematic diagram of an electronic device according to an embodiment of the present invention.
Figure 2:
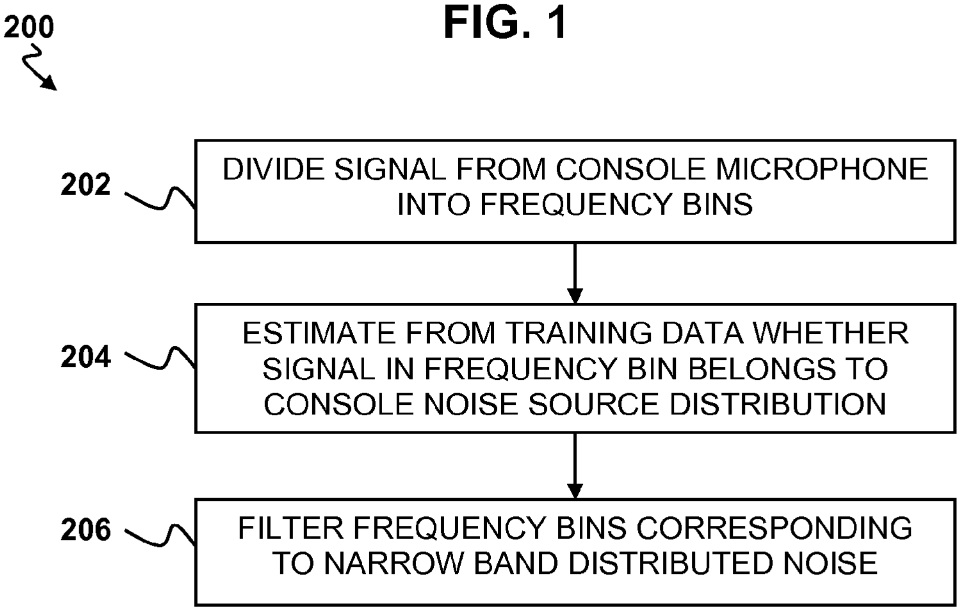
FIG. 2 is a flow diagram of a method for reduction of noise in a device of the type shown in FIG. 1.

As depicted in FIG. 1 an electronic device 100 according to an embodiment of the present invention includes a console 102 having one or more microphones 104A, 104B. As used herein, the term console generally refers to a stand-alone unit containing electronic components that perform computation and/or signal processing functions. The console may receive inputs from one or more input external devices, e.g., a joystick 106, and provide outputs to one or more output external devices such as a monitor 108. The console 102 may include a central processor unit 110 and memory 112. The console may include an optional fan 114 to provide cooling of the console components. By way of example, the console 102 may be a console for a video game system, such as a Sony PlayStation®, a cable television set top box, a digital video recorder, such as a TiVo® digital video recorder available from TiVo Inc. of Alviso, Calif.

The processor unit 110 and memory 112 may be coupled to each other via a system bus 116. The microphones 104A, 104B may be coupled to the processor and/or memory through input/output (I/O) elements 118. As used herein, the term I/O generally refers to any program, operation or device that transfers data to or from the console 100 and to or from a peripheral device. Every data transfer may be regarded as an output from one device and an input into another.

The device 100 may include one or more additional peripheral units which may be internal to the console 102 or external to it. Peripheral devices include input-only devices, such as keyboards and mouses, output-only devices, such as printers as well as devices such as a writable CD-ROM that can act as both an input and an output device. The term "peripheral device" includes external devices, such as a mouse, keyboard, printer, monitor, microphone, game controller, camera, external Zip drive or scanner as well as internal devices, e.g., a disk drive 120 such as a CD-ROM drive, CD-R drive, hard disk drive or DVD drive, an internal modem other peripheral such as a flash memory reader/writer, hard drive.

The console includes at least one source of narrow-band distributed noise such as the disk drive 120. Narrow band noise from the disk drive 120 may be filtered from digital signal data generated from microphone inputs $x_A(t)$, $x_B(t)$ so that desired sounds, e.g., voice, from a remote source 101 are not drowned out by the sound of the disk drive 120. The narrow band noise may be characterized by a gamma distribution. The desired sound from the source 101 is preferably characterized by a broad band probability density function distribution such as a Gaussian-distributed probability density function.

The memory 112 may contain coded instructions 113 that can be executed by the processor 110 and/or data 115 that facilitate removal of the narrow band disk drive noise. Specifically, the data 115 may include a distribution function generated from training data of many hours of recording of sounds from disk drive. The distribution function may be stored in the form of a lookup table.

The coded instructions 113 may implement a method 200 for reducing narrow band noise in a device of the type shown in FIG. 1. According to the method 200 a signal from one or more of the console microphone input signals 104A, 104B is divided into frequency bins, as indicated at 202. Dividing the signal into a plurality of frequency bins may include capturing a time-windowed portion of the signal (e.g., microphone signal $x_A(t)$), converting the time-windowed portion to a frequency domain signal x(f) (e.g., using a fast Fourier transform) and dividing the frequency domain signal amongst the frequency bins. By way of example, approximately 32 ms of microphone data may be stored in a buffer for classification into frequency bins. For each frequency bin it is determined whether a portion of the signal within the frequency bin belongs to a narrow band distribution characteristic of the narrow band disk drive noise as indicated at 204. Any frequency bins containing portions of the signal belonging to the narrow band distribution are filtered from the input signal and indicated at 206.

Figure 3A:
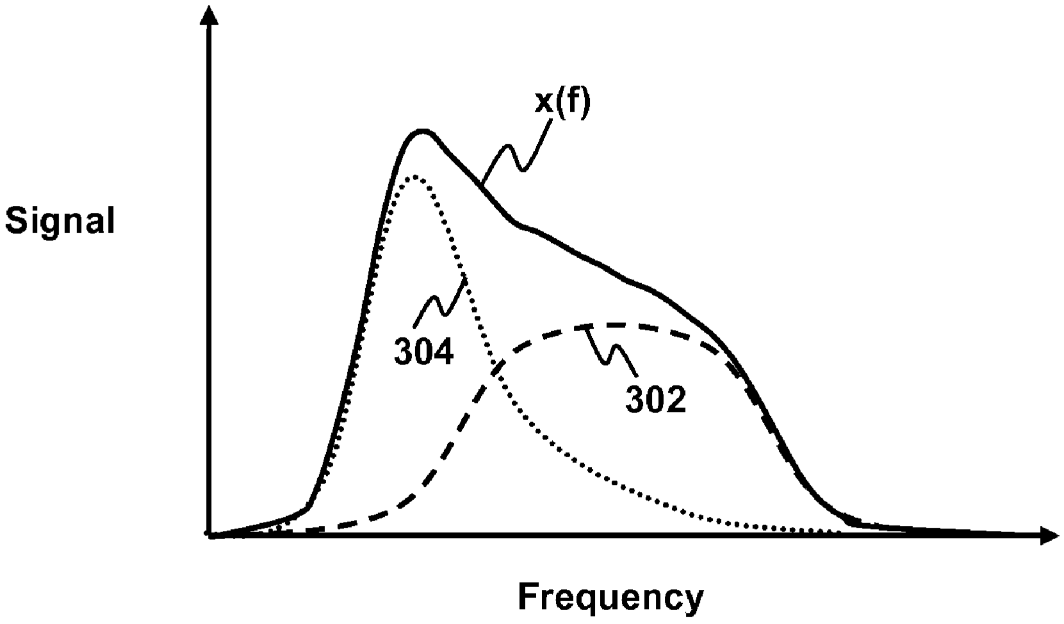
FIGS. 3A-3B are graphs of microphone signal as a function of frequency illustrating reduction of narrow band noise according to embodiments of the present invention.
Figure 3B:
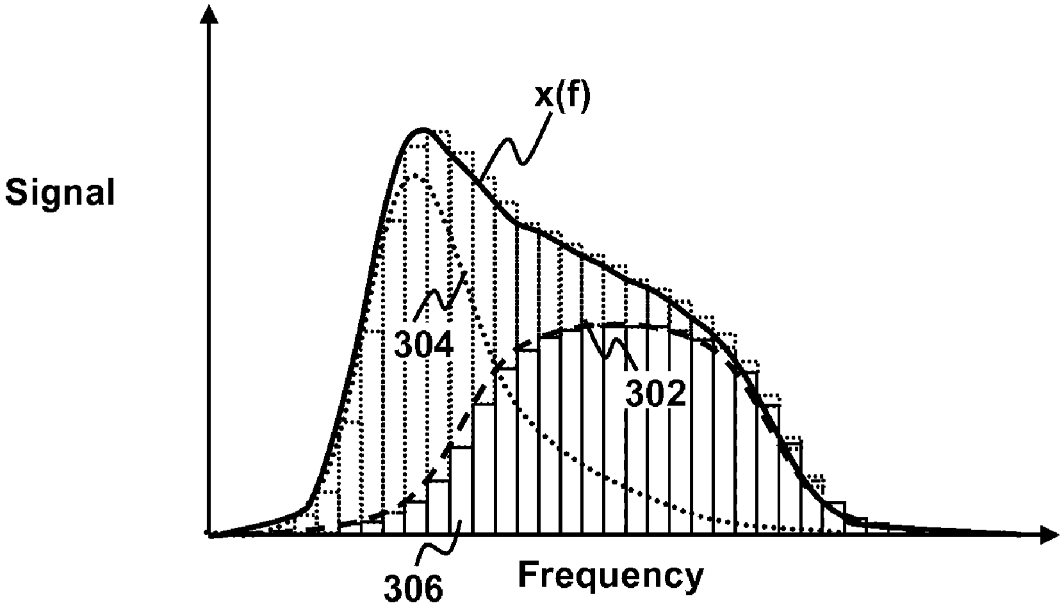

Filtering the input signal may be understood with respect to FIGS. 3A-3B. Specifically, as shown in FIG. 3A, the frequency domain signal x(f) may be regarded as a combination of a broadband signal 302 and a narrow band signal 304. When these signals are divided into frequency bins 306, as shown in FIG. 3B, each bin contains a value corresponding to a portion of the broadband signal 302 and a portion of the narrow band signal 304. The portion of the signal x(f) in a given frequency bin 306 due to the narrow band signal 304 (indicated by the dashed bars in FIG. 3B) may be estimated from the training data. This portion may be subtracted from the value in the frequency bin 306 to filter out the narrow band noise from that bin.

The narrow band signal 304 may be estimated as follows. First narrow band signal samples may be collected in a large volume to train its distribution model. Distribution models are widely known to those of skill in the pattern recognition arts, such as speech modeling. The distribution model for the narrow band signal 304 is similar to those used in speech modeling with a few exceptions. Specifically, unlike speech, which is considered broadband with a Gaussian distribution, the narrow band noise on in the narrow band signal 304 has a "Gamma" distribution density function. The distribution model is known as a "Gamma-Mixture-Model". Speech applications, such as speaker/language identification, by comparison usually use a "Gaussian-Mixture-Model". The two models are quite similar. The underlying distribution function is the only significant difference. The model training procedure follows an "Estimate-Maximize" (EM) algorithm, which is widely available in speech modeling. The EM algorithm is an iterative likelihood maximization method, which estimates a set of model parameters from a training data set. A feature vector is generated directly from a logarithm of power-spectrum. By contrast, a speech model usually applies further compression, such as DCT or cepstrum-coeficient. This is because the signal of interest is narrow band, and band averaging that possibly has attenuation in broadband background is not desired. In real-time, the model is utilized to estimate a narrow-band noise power spectrum density (PSD).

An Algorithm for Such a Model may Proceed as Follows:

First, the signal x(t) is transformed from the time domain to the frequency domain.

$$X(k)=fft(x(t)), \text{ where } k \text{ is a frequency index.}$$

Next, a power spectrum is obtained from the frequency domain signal X(k).

$S_{yy}(k)=X(k).*\mathrm{conj}(X(k))$, where "conj" refers to the complex conjugate.

Next, a feature vector V(k) is obtained from the logarithm of power spectrum.

$$V(k)=\log(S_{yy}(k))$$

The term "feature Vector" is a common term in pattern recognition. Essentially any pattern matching includes 1) a pre-trained model that defines the distribution in priori feature space, and 2) runtime observed feature vectors. The task is to match the feature vector against the model. Given a prior trained gamma <Model>, the narrow-band noise presence probability <$P_n(k)$>may be obtained for this observed feature V(k).

$$P_n(k)=\mathrm{Gamma}\ (\mathrm{Model},\ V(k))$$

The narrow-band noise PSD is adaptively updated:

$$S_{nn}(k)=\{\alpha*S_{nn}(k)+(1-\alpha)*S_{yy}(k)\}*P_n(k)+S_{nn}(k)*(1-P_n(k))$$

If $P_n(k)$ is zero, that is no narrow-band noise is present, the $S_{nn}(k)$ does not change. If $P_n(k)=1$, that is this frequency <k> is entirely narrow-band noise, then:

$$S_{nn}(k)=\alpha*S_{nn}(k)+(1-\alpha)*S_{yy}(k)$$

This is essentially a statistical periodgram averaging, where $\alpha$ is a smoothing factor.

Given the estimated noise PSD, it is thus straightforward to estimate the clean voice signal. An example of an algorithm for performing such an estimation is based on the well-known MMSE estimator, which is described by Y. Ephraim and D. Malah, in "Speech enhancement using a minimum mean-square error short-time spectral amplitude estimator," *IEEE Trans. Acoust., Speech, Signal Processing*, Vol. ASSP-32, pp, 1109-1121, December 1984 and Y. Ephraim and D. Malah, "Speech enhancement using a minimum mean-square error log-spectral amplitude estimator," *IEEE Trans. Acoust., Speech, Signal Processing*, Vol. ASSP-33, pp, 443-445, April 1985, the disclosures of both of which are incorporated herein by reference.

Figure 4A:
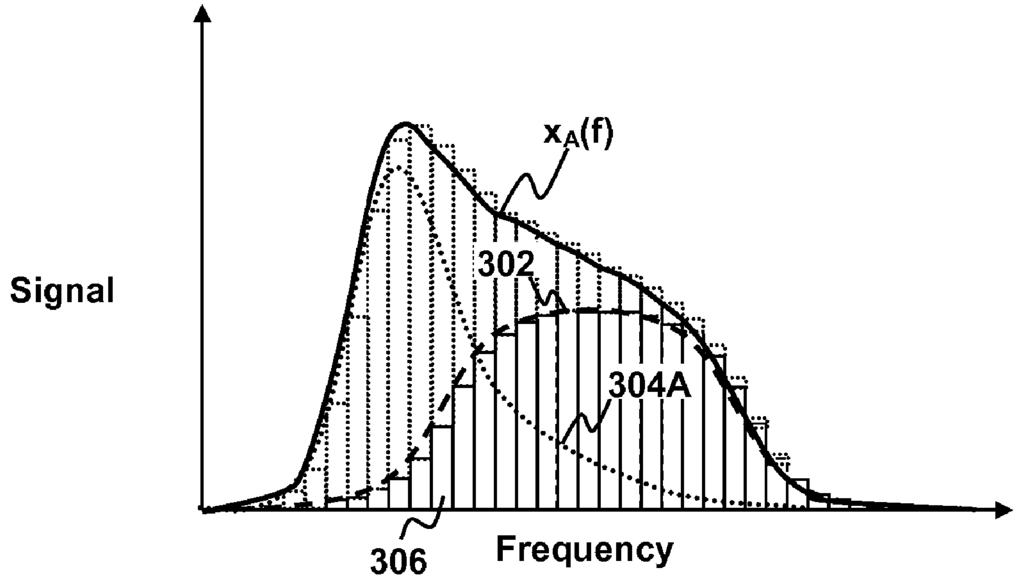
FIGS. 4A-4B are graphs of microphone signals for different microphones as a function of frequency illustrating reduction of narrow band noise according to alternative embodiments of the present invention.
Figure 4B:
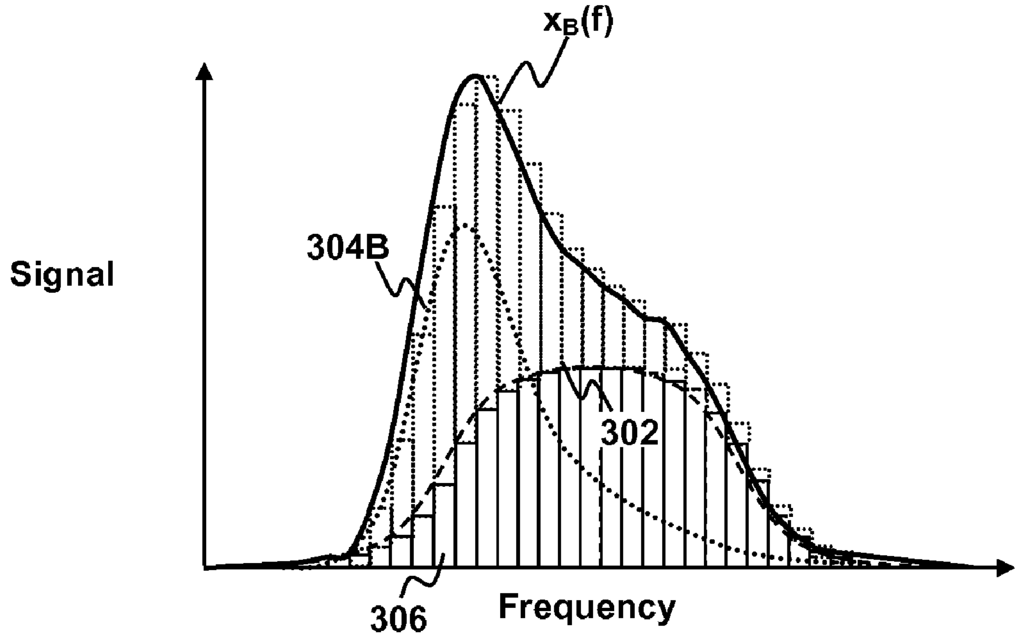

In alternative embodiments, the filtering may take advantage of the presence of two or more microphones 104A, 104B on the console 102. If there are two microphones 104A, 104B on the console 102 one of them (104B) may be closer to the disk drive than the other (104A). As a result there is a difference in the time of arrival of the noise from the disk drive 120 for the microphone input signals $x_A(t)$ and $x_B(t)$. The difference in time of arrival results in different frequency distributions for the input signals when they are frequency converted to $x_A(f)$, $x_B(f)$ as illustrated in FIGS. 4A-4B. The frequency distribution of broadband sound from remote a sources, by contrast, will not be significantly different for $x_A(f)$, $x_B(f)$. However the frequency distribution for the narrow band signal 304A from microphone 104A will be frequency shifted relative to the frequency distribution 304B from microphone 104B. The narrow band noise contribution to the frequency bins 306 can be determined by generating a feature vector V(k) from the frequency domain signals $x_A(f)$, $x_B(f)$ from the two microphones 104A, 104B.

By way of example, a first feature vector V(k,A) is generated from the power spectrum $S_{yy}(k,A)$ for microphone 104A:

$$V(k,A)=\log(S_{yy}(k,A))$$

A second feature vector V(k,B) is generated from the power spectrum $S_{yy}(k,B)$ for microphone 104B:

$$V(k,B)=\log(S_{yy}(k,B))$$

The feature vector V(k) is then obtained from a simple concatenation of V(k,A) and V(k,B)

$$V(k)=[V(k,1),\ V(k,2)]$$

The rest model training, real-time detection, they are the same, except now the model size and feature vector dimension are doubled. Although the above technique uses neither array beam forming, nor anything that depends on time-difference-arrival the spatial information is actually implicitly included in the trained model and runtime feature vectors, they can greatly improve detection accuracy.

Embodiments of the present invention may be used as presented herein or in combination with other user input mechanisms and notwithstanding mechanisms that track or profile the angular direction or volume of sound and/or mechanisms that track the position of the object actively or passively, mechanisms using machine vision, combinations thereof and where the object tracked may include ancillary controls or buttons that manipulate feedback to the system and where such feedback may include but is not limited light emission from light sources, sound distortion means, or other suitable transmitters and modulators as well as controls, buttons, pressure pad, etc. that may influence the transmission or modulation of the same, encode state, and/or transmit commands from or to a device, including devices that are tracked by the system and whether such devices are part of, interacting with or influencing a system used in connection with embodiments of the present invention.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for reduction of noise in a device having a console with one or more microphones and a source of narrow band distributed noise located on the console, the method comprising:

obtaining a signal from the one or more microphones containing a broad band distributed desired sound and narrow band distributed noise from the source located on the console;

dividing the signal amongst a plurality of frequency bins;

for each frequency bin, determining whether a portion of the signal within the frequency bin belongs to a narrow band distribution characteristic of the source of narrow band noise located on the console by generating a feature vector from a logarithm of a power-spectrum of the signal and comparing the feature vector against a pre-trained model; and filtering from the signal any frequency bins containing portions of the signal belonging to the narrow band distribution.

2. The method of claim 1, wherein determining whether a portion of the signal within the frequency bin belongs to the narrow band distribution includes comparing a value corresponding to the portion of the signal in the frequency bin to a stored value for that frequency bin derived from a known signal from the source of narrow band noise located on the console.

3. The method of claim 1, wherein the one or more microphones include a first microphone and a second microphone, wherein, obtaining a signal from the one or more microphones includes obtaining a first signal from the first microphone and obtaining a second signal from the second microphone, wherein determining whether a portion of the signal within the frequency bin belongs to the narrow band distribution includes determining a first vector feature from the first signal and obtaining a second vector feature from the second signal, concatenating the first and second signals to form a combined vector feature and matching the combined feature vector against a model.

4. The method of claim 1, wherein dividing the signal amongst a plurality of frequency bins includes capturing a time-windowed portion of the signal, converting the time-windowed portion to a frequency domain signal and dividing the frequency domain signal amongst the plurality of frequency bins.

5. The method of claim 1 wherein the broad band distributed desired sound is a voice sound.

6. The method of claim 1 wherein the source of narrow band distributed noise is a disk drive.

7. The method of claim 1 wherein the broad band distributed desired sound is characterized by a Gaussian-distributed probability density function.

8. The method of claim 1 wherein the narrow band noise is characterized by a gamma-distributed probability density function.

9. An electronic device, comprising:

a console;

one or more microphones located on the console;

a source of narrow band distributed noise located on the console;

a processor coupled to the microphone;

a memory coupled to the processor, the memory having embodied therein a set of processor readable instructions for implementing a method for reduction of noise, the processor readable instructions including:

instructions which, when executed, cause the device to obtain a signal from the one or more microphones containing a broad band distributed desired sound and narrow band distributed noise from the source located on the console by generating a feature vector from a logarithm of a power-spectrum of the signal and comparing the feature vector against a pre-trained model;

instructions which, when executed, divide the signal amongst a plurality of frequency bins;

instructions which, when executed, determine, for each frequency bin, whether a portion of the signal within the frequency bin belongs to a narrow band distribution characteristic of the source of narrow band noise located on the console; and instructions which, when executed, filter from the signal any frequency bins containing portions of the signal belonging to the narrow band distribution.

10. The device of claim 9, wherein the instructions which, when executed, determine whether a portion of the signal within the frequency bin belongs to the narrow band distribution include one or more instructions which, when executed, compare a value corresponding to the portion of the signal in the frequency bin to a stored value for that frequency bin derived from a known signal from the source of narrow band noise located on the console.

11. The device of claim 10 further comprising a look-up table stored in the memory, wherein the look-up table contains the stored value.

12. The device of claim 9, wherein the one or more microphones include a first microphone and a second microphone.

13. The device of claim 9 wherein the instructions which, when executed, obtain a signal from the one or more microphones include one or more instructions which, when executed cause the device to obtain a first signal from a first microphone and obtain a second signal from a second microphone, wherein determining whether a portion of the signal within the frequency bin belongs to the narrow band distribution includes determining a first vector feature from the first signal and obtaining a second vector feature from the second signal, concatenating the first and second signals to form a combined vector feature and matching the combined feature vector against a model.

14. The device of claim 9 wherein instructions which, when executed, divide the signal amongst a plurality of frequency bins include instructions which, when executed, directed the device to capture a time-windowed portion of the signal, converting the time-windowed portion to a frequency domain signal and divide the frequency domain signal amongst the plurality of frequency bins.

15. The device of claim 9 wherein the broad band distributed desired sound is a voice sound.

16. The device of claim 9 wherein the source of narrow band distributed noise is a disk drive.

17. The device of claim 9 wherein the broad band distributed desired sound is characterized by a Gaussian-distributed probability density function.

18. The device of claim 9 wherein the narrow band noise is characterized by a gamma-distributed probability density function.

19. The device of claim 9, wherein the console is a video game console.

20. The device of claim 9 wherein the console is a cable television set top box or a digital video recorder.

21. A processor readable medium having embodied therein a set of processor executable instructions for implementing a method for reduction of noise in an electronic device having a console, one or more microphones located on the console, a source of narrow band distributed noise located on the console, a processor coupled to the microphone and a memory coupled to the processor, the processor readable instructions including:

instructions which, when executed, cause the device to obtain a signal from the one or more microphones containing a broad band distributed desired sound and narrow band distributed noise from the source located on the console;

instructions which, when executed, divide the signal amongst a plurality of frequency bins;

instructions which, when executed, determine, for each frequency bin, whether a portion of the signal within the frequency bin belongs to a narrow band distribution characteristic of the source of narrow band noise located on the console by generating a feature vector from a logarithm of a power-spectrum of the signal and comparing the feature vector against a pre-trained model; and instructions which, when executed, filter from an output signal any frequency bins containing portions of the signal belonging to the narrow band distribution.

* * * * *